Jan. 22, 1963 J. A. BOBROW 3,074,112

APPARATUS FOR MOLDING AN EMBEDMENT WITHIN A PLASTIC MASS

Filed April 15, 1959

Inventor:
Joseph A. Bobrow
By Hofgren, Brady, Wegner, Allen & Stellman
Attorneys Jan. 22, 1963 J. A. BOBROW 3,074,112
APPARATUS FOR MOLDING AN EMBEDMENT WITHIN A PLASTIC MASS
Filed April 15, 1959
2 Sheets-Sheet 2

Inventor:
Joseph A. Bobrow
By: Hofgren, Brady, Wegner, Allen & Stellman
Attorneys United States Patent Office 3,074,112

Patented Jan. 22, 1963

3,074,112
APPARATUS FOR MOLDING AN EMBEDMENT WITHIN A PLASTIC MASS

Joseph A. Bobrow, Wilmette, Ill.
(1029 Pine St., Glenview, Ill.)

Filed Apr. 15, 1959, Ser. No. 806,676
3 Claims. (Cl. 18—36)

This invention relates to the general field of embedding objects in a plastic mass and more particularly to an apparatus for obtaining embedments within a mass at a predetermined precise position therein. The invention also relates to the article resulting from following the steps of the methods employed in using the apparatus.

In the past there have been in existence various types of articles having embedments in a relatively clear water-white plastic such as "Lucite," an acrylic resin. The most common of such articles are novelty items such as are often used as pendants on key chains and the like. An object of interesting appearance or emblematic of a social group are sometimes embedded in a clear plastic simply for the aesthetic appearance of the object. Such embedments have generally been made by filling a mold cavity partially full with the plastic, the object to be embedded being placed in the cavity upon the plastic, after which additional plastic is placed in the cavity to fill the same. Thereafter the mass is cured with the embedment therein. Such embedments are seldom located with any particular accuracy and successive embedments made are seldom identical, except by accident.

Many applications require an accurate location of an embedment. In the past, the techniques available have not permitted an accurate location of embedment within a plastic mass. The migration or movement of the embedment within the mass during the molding of the plastic has generally been the usual experience. The pressures under which the plastic is cured have generally caused embedments to move out of a position.

The present invention involves an apparatus for performing the method of embedding, permitting an embedment to be extremely accurately located relative to the surfaces of a body in which the embedment is placed. It is therefore the principal object of this invention to provide a new and improved apparatus for making embedments and a new product resulting from following the steps of the new method.

Another object of the invention is to provide a novel apparatus for locating an embedment in a precise predetermined position relative to surfaces of a plastic body.

Another object is to provide an apparatus for embedment permitting the reproduction of a plurality of embedments in a plastic mass, each of which will be practically identical and each having the same precise location of the embedment relative to the surfaces of the plastic mass.

A further object is to provide an apparatus precisely locating embedments in a plastic mass where the embedment is either entirely within the mass, located at or adjacent a surface of the mass, or partially within and extending out of the mass in which it is embedded.

Other features, objects and advantages of the present invention will be apparent from the following description of the apparatus and articles produced, taken in reference to the accompanying drawings illustrating the same, and in which.

Figures 7, 8, 9, 10, 11, 12, 13, 14, 15:
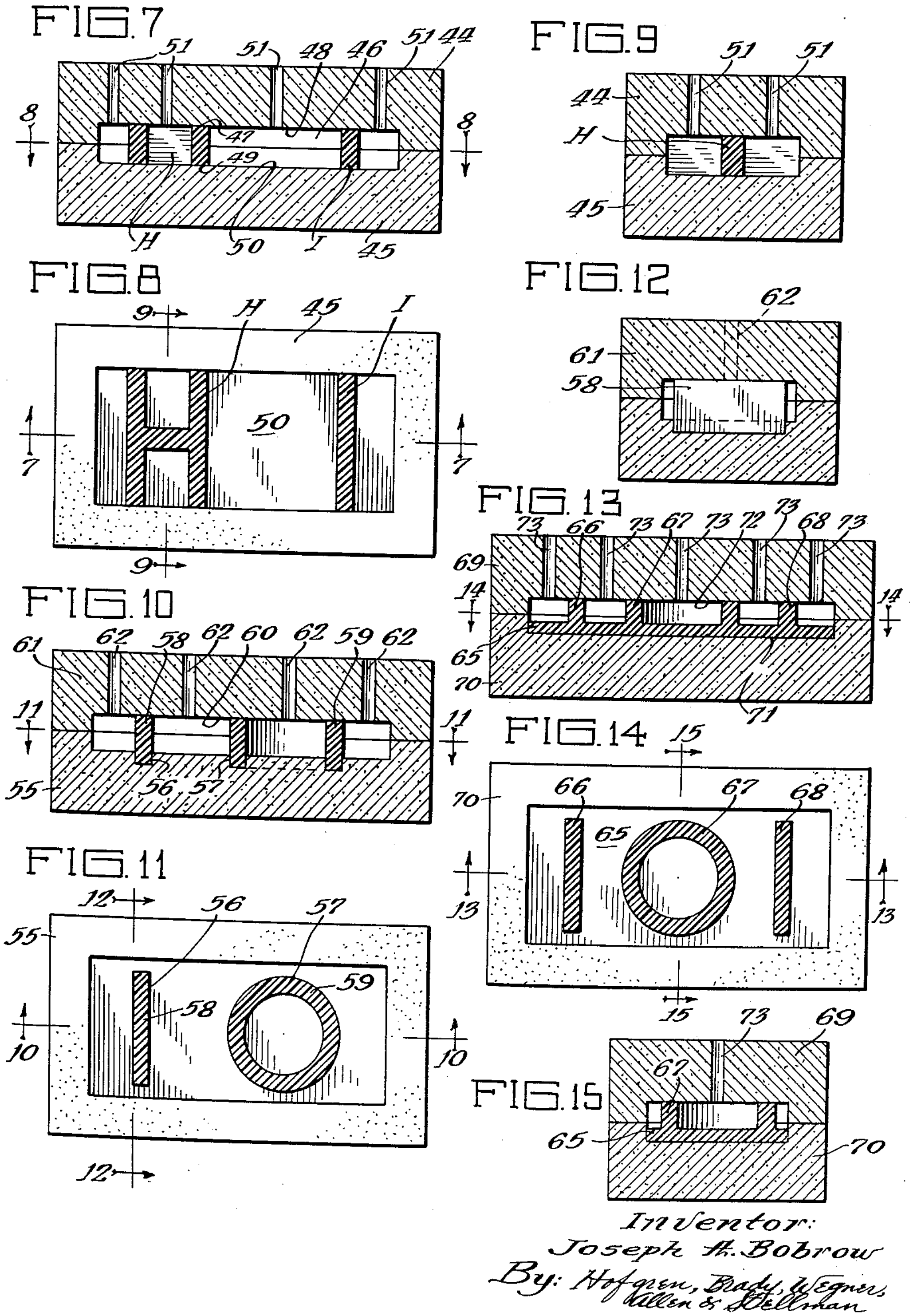
FIGURE 7 is a vertical sectional view through a mold illutrating embedding an object wherein two surfaces of the embedment are coincident with surfaces of the plastic mass, and taken substantially along line 7—7 in FIGURE 8.
FIGURE 8 is a view of one-half of the mold shown in FIGURE 7 with the view taken substantially along line 8—8 therein.
FIGURE 9 is a vertical sectional view through the molds shown in FIGURES 7 and 8, the view taken substantially along line 9—9 in FIGURE 8.
FIGURE 10 is a view similar to FIGURE 7, taken substantially along line 10—10 in FIGURE 11 showing a mold in which the embedment is partially within and extends out of the plastic mass in which embedded.
FIGURE 11 is a view similar to FIGURE 8, taken substantially along line 11—11 in FIGURE 10.
FIGURE 12 is a vertical sectional view through the mold shown in FIGURES 10 and 11, taken substantially along line 12—12 in FIGURE 11.
FIGURE 13 is a view similar to FIGURES 7 and 10 illustrating a mold with an embedment therein, having slightly different form of support and taken substantially along line 13—13 in FIGURE 14.

FIGURE 14 is a plan view of one-half of the mold shown in FIGURE 13 and taken substantially along line 14—14 in FIGURE 13, and FIGURE 15 is a vertical sectional view through the mold shown in FIGURES 13 and 14, taken substantially along line 15—15 in FIGURE 14.

The present invention involves an apparatus which may be used to locate an embedment in a plastic mass at a precise location which can be predetermined within a very small tolerance. It is contemplated that the controls permitted by following the steps disclosed for using the apparatus of the present invention will permit location of an embedment within a few thousandths of an inch relative to the surface of the plastic part. The location can be made within as close a tolerance as can be achieved within the normal shrinkage characteristics, if any, of the materials used in molding the plastic mass. The preferred plastic for making embedments which must be viewed when in place is an acrylic resin such as "Lucite" as made by E. I. du Pont de Nemours & Co.

Conventional methods of molding such as injection and compression molding are adaptable to the making of embedments. In developmental and experimental laboratory work, following the steps to be outlined, for reasons of economy, it is preferred to use low cost temporary molds which may be used with dough-molding techniques. The arcylic resins for use in such temporary molds may be of methyl methacrylate monomer-polymer mixtures. The molds may be formed in the usual temporary mold forms including plaster-of-Paris molds which are generally simple and economical to build and rather structurally weak. Where reproduction of a particular embedment in quantity is desired, a more permanent type of mold is preferred, particularly with conventional molding methods.

Figures 1, 2, 3, 4, 5, 6:
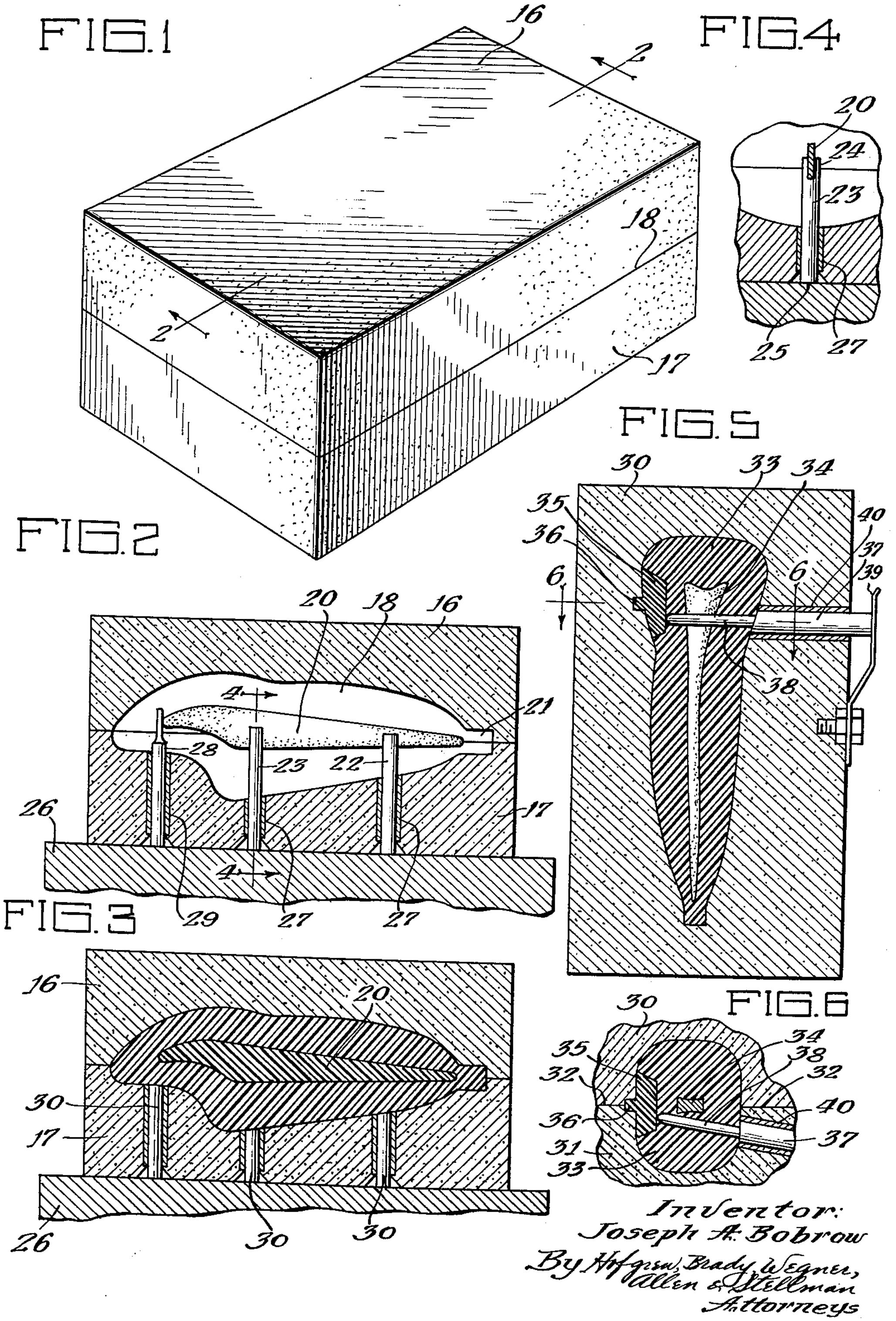
FIGURE 1 is a perspective view of a temporary mold for forming a plastic mass with an embedment therein.
FIGURE 2 is a vertical section through the mold taken substantially along line 2—2 in FIGURE 1, and at a slightly reduced scale illustrating a preliminary step in the process.
FIGURE 3 is a view similar to FIGURE 2, illustrating a subsequent step in the process.
FIGURE 4 is a fragmentary sectional view through one of the supports in the embedment taken substantially along line 4—4 in FIGURE 2.
FIGURE 5 is a sectional view through another mold showing the placement of an embedment at the surface of the plastic mass.
FIGURE 6 is a fragmentary sectional view taken substantially along line 6—6 in FIGURE 5.

The apparatus of the present invention which may be employed to locate an embedment entirely within a plastic mass is illustrated in FIGURES 1 through 4. In FIGURE 1 a temporary mold having an upper half 16 and a lower half 17 with a parting line 18 therebetween is shown as having a flat upper and lower surface for placement within a small hand press. In FIGURES 2 and 3 the upper and lower surface of the mold are shown as forming a cavity 18 between them substantially in the shape of an enlarged human tooth. For purposes of illustrating the present invention, a clear plastic tooth model is illustrated wherein the pulp or nerve of the tooth is to be accurately located within the tooth body. Such models of teeth are used in educational institutions and in dentists offices for the purpose of illustrating the form and nature of the human tooth to both students and patients.

The embedment illustrated in FIGURES 2 through 4 is a stable preformed member 20 which may be formed of a plastic compatible with acrylic resin, a wood, metal or composition material. Since the body to be molded in the cavity is to be water-white, a colored embedment is preferred and in the present illustration the embedment should be of red or red tinted color to illustrate the dental pulp. The plastic body to be molded includes the entire tooth, including its root, and a base portion 21 by which the model may be mounted in an upright visible fashion. The representation of a tooth is made for purposes of illustrating the steps of the invention and any desirable body shape may be used with desired embedments.

The location of an embedment relative to the surfaces of a mold cavity may be determined and supporting structure placed in the mold to insure that the embedment is properly located. In the present invention, the embedment 20 is supported upon a plurality of pins, such as 22 and 23 (FIGURE 2). The form of the pins may be such that the upper end 24 is bifurcated to receive frictionally the embedment 20, as illustrated in FIGURE 4. The outer end 25 of the pin is generally flat so as to engage upon a lower frame 26 of a press. The pins are slidable snugly within metal sleeves 27 placed in the lower mold half 17. When the pins rest upon the upper surface of the press plate 26, their upper ends will be located relative to the mold cavity. This same location will result in each succeeding molding operation. The placement of the embedment in the pins can thus accurately determine the position of the embedment relative to the mold cavity walls. In addition to the pins 22 and 23, a pin 28, likewise slidable in a sleeve 29, may be used to locate the embedment lengthwise of the cavity by abutting the embedment against the inner end of the pin 28.

The use of dough-molding techniques permits the filling of each half of the cavity with the dough-like monomer-polymer mixture so that the plastic is in place and in slight excess in the upper half as the mold is closed upon the embedment placed as specified. The application of pressure to the mold causes the plastic mass to fill all voids in the cavity. The mass extends about the embedment and about its pin supports. Following a short period of application of the pressure, the mold is removed from the press and the pins 22, 23 and 28 are removed from the mold by sliding them out through the sleeves 27 and 29. The pressure on the plastic mass in the cavity will be changed slightly due to the removal of the pins. The pressure will change throughout the mass equally since the mass is under the conditions present, acting in the manner of a fluid. The plastic mass thus holds the embedment in its preselected position since there are no forces acting upon the embedment to cause it to move from this position. The particular shape of the pins and their contact with the embedment are so made that the removal of the pins will not disturb the position of the embedment in the mold cavity. Following the removal of the pins, plug pins 30 are inserted so that their inner ends make continuations of the mold cavity walls when their outer ends engage the upper surface of the press plate 26. Once this has been done, the mold may be placed back in the press to cure the plastic. The space occupied by the positioning pins is filled by the plastic without causing any movement by the embedment. When cured, a plastic body with the embedment accurately located therein may be removed from the mold.

The pins described are chosen in their particular form shown to hold the particular embedment. Other forms of supports in the nature of pins, rods or members may be used, each designed for holding the particular embedment relative to the walls of the cavity. In the process of removing the pins, the plastic is under sufficient pressure so that it would normally extrude through the openings in the mold vacated by the pins. The material is generally of sufficient viscose nature that sufficient time is permitted to place the plugs in the sleeves avoiding any plastic extrusions.

The FIGURES 5 and 6 show the forming of an embedment where one surface of the embedment is adjacent the surface of the plastic body being molded. The mold halves 30 and 31 are separable along the line 32. The tooth form 33 is shown as having an embedment 34 similar to the embedment 20. In addition to this embedment, a second embedment 35 in the nature of a body intended to illustrate a filling in the tooth, is embedded in the plastic at the side of the body. In order to support the embedment 35 during the introduction and curing of the plastic mass, the embedment is provided with a boss 36 received in a corresponding opening in the mold. An elongated pin 37 has a smaller portion 38 extending through the cavity and bearing at its inner end on the embedment 35. A spring clip 39 may be used to hold the pin yieldingly against the embedment, the pin being slidable in the sleeve 40 placed in the mold.

The procedures for obtaining the embedment 35 in the plastic body are the same as those described above in relation to FIGURES 1 through 4. Once the plastic mass surrounds the embedment on all its exposed sides, the mass will retain the embedment in position while the supporting pin is removed. The opening through the sleeve 40 may be closed by an appropriate plug, in the same manner as illustrated in FIGURE 3. Should the embedment be of a plastic material, it will chemically bond with the acrylic resin forming the clear plastic body.

While the apparatus for carrying out the methods of embedment have been shown as contained within a replica at a much enlarged scale of a human tooth, the technical steps are applicable to embedding any object of any material compatible with the plastic body. Additionally, the plastic body may be of any desired shape. It is preferable that the resin used be one subject to as little shrinkage as possible since the shrinkage factor must be taken into consideration in the placement of the embedment relative to the surface of the object, or shrinkage controlled otherwise in accordance with known techniques.

FIGURES 7 through 9 illustrate an apparatus similar to that shown in FIGURES 5 and 6. The mold may be formed of an upper half 44 and a lower half 45 between which the cavity 46 is formed. The embedments shown for purposes of illustration are the letter H and the letter I. These may be formed of a plastic compatible with the acrylic resin. The embedments are of sufficient width that one surface such as 47 on the letter H may abut a wall 48 of the upper mold and the opposite surface 49 may abut the wall 50 of the lower molded half. The embedment is actually clamped between the mold walls holding the embedment in its predetermined position within the mold cavity. Sufficient passages 51 are provided for the introduction of the plastic mass to fill all voids within the mold cavity. In this instance, the mold walls themselves retain the embedments during the introduction of the plastic mass and the curing of the same. As a result of this process, an embedment may be achieved wherein the embedment may extend between faces or surfaces of the plastic mass in which it is embedded. The position of the embedment is accurately obtained.

In FIGURES 10 through 12, a similar embedding technique is shown wherein the lower mold half 55 is provided with grooves such as 56 and 57 for the reception of a portion of the embedment. The embedment 58 on the left is in the form of a letter I, the lower portion of which is of the size to be received in the groove 56. The embedment 59 on the right (FIGURES 10 and 11) is of a size and shape to fit into the groove 57. The width of the embedments are chosen so that the opposite side opposite the grooves will abut the surface 60 of the upper mold half 61. Here also, sufficient passages 62 are provided in the upper mold half 61 for the introduction of a plastic mass to fill all voids within the cavity and about the embedments.

The resultant product from the mold form shown in FIGURES 10 through 12 provides an embedment accurately located in the plastic mass with a portion thereof in the mass and a portion extending outwardly from the mass. The mold halves are utilized to accurately position and retain the embedment during the introduction of the plastic mass and during the curing thereof. Here also, the embedment may extend from one surface of the plastic mass through the body and out of the opposite side.

Several different mechanical means may be employed to hold the embedment relative to the cavity walls to insure accurate positioning within a body. In FIGURES 13 through 15, an embedment is shown having a base part 65 from which upstanding parts 66, 67 and 68 extend. The central part 67 is a circular cylindrical member and the parts 66 and 68 are in the form of a bar. In this instance, the base plate 65 is of a size to extend between opposite side walls of the wall cavity formed between the upper mold half 69 and lower half 70. In the form shown, the base member is coextensive with the cavity so that its lower surface 71 sits in the lower mold 70 and the upstanding portions of the embedment are of a sufficient length to engage the upper mold surface 72. When the mold is closed, the embedment is locked in its predetermined position. Sufficient passages 73 may be provided for the introduction of a plastic mass into all voids within the mold cavity. The mold is retained closed during the introduction and curing of the plastic mass.

In the form of the invention just described, a difference in color between a plastic embedment and the plastic mass in which it is embedded can result in a distinction between the embedment and mass as viewed in the final product. The light collecting qualities of the acrylic resins may be utilized in such instances to make quite visible embedments relative to the plastic mass. The accuracy and stability of location of the embedment is retained. In some instances, the base member 65 of the embedment may have portions engaging the walls of the cavity without extending over the entire extent of the cavity as shown.

The methods of embedding, described above, may be used to accurately hold any compatible embedment in a desired, accurate location within a body and can be done at quite reasonable costs. It is contemplated that the uses of the embedding techniques disclosed herein may extend to technical and scientific fields as well as fields concerned with conveyance of information such as signs or identification symbols.

The technique of molding described in reference to FIGURES 7 through 15 may be used to successfully make embedements where the embedment itself is a plastic molded into a preformed enclosing body. For example, some processes may usefully employ embedments such as H and I (FIGURES 7–9) which are themselves a plastic injected into cavities shaped as shown in a plastic mass which surrounds the embedments.

The foregoing detailed description has been given for clearness of understanding only, and no unnecessary limitations should be understood therefrom for some modifications will be obvious to those skilled in the art.

I claim:

1. Apparatus for molding an embedment in a predetermined location within a plastic mass, comprising: mold means having a cavity, positioning members extending into the cavity and having supporting surfaces for supporting the weight of the embedment within the cavity, said positioning members having positioning surfaces for engaging said embedement laterally of said supporting surfaces and preventing lateral movement of the embedment off of said supporting surfaces, and other positioning members having surfaces for extending over and engaging said embedment preventing movement of the embedment transversely of said lateral direction whereby the positioning surfaces and other positioning members maintain the embedment upon the supporting surfaces in said predetermined location.

2. Apparatus for molding an embedment in a predetermined position within a plastic mass, comprising: mold means having a cavity, means in the cavity providing a support for the weight of the embedment and having surfaces preventing downward movement of the embedment by gravity within the cavity, positioning means in the cavity having surfaces contacting the embedment serving to prevent movement of the embedment laterally of the support for the weight of the embedment, and means providing surfaces in contact with the embedment opposite said weight support to prevent movement of the embedment in a direction transverse said lateral direction whereby the embedment may be held in said predetermined position in the cavity.

3. Apparatus for molding an embedment at a precise predetermined location within a plastic mass comprising: mold means having a cavity in which the mass is to be molded, embedment positioning means in the cavity having surfaces for supporting the weight of an embedment in a predetermined position within the cavity, surfaces on said positioning means for engaging said embedment and preventing movement of the embedment within the cavity in one plane and means providing surfaces for engaging the embedement to prevent movement of the embedment in a direction transverse to said plane, said surfaces cooperating to hold the embedment against movement during molding of the plastic mass.

References Cited in the file of this patent

UNITED STATES PATENTS

| | | |
|---|---|---|
| 721,462 | Richards | Feb. 24, 1903 |
| 2,203,694 | Morin et al. | June 11, 1940 |
| 2,361,348 | Dickson et al. | Oct. 24, 1944 |
| 2,405,329 | Ruebensaal | Aug. 6, 1946 |
| 2,651,079 | Michaelson et al. | Sept. 8, 1953 |
| 2,663,910 | Danielson et al. | Dec. 29, 1953 |
| 2,747,230 | Magnus | May 29, 1956 |

FOREIGN PATENTS

| | | |
|---|---|---|
| 599,570 | Great Britain | Mar. 16, 1948 |